United States Patent [19]

Albert et al.

[11] Patent Number: 5,167,309
[45] Date of Patent: Dec. 1, 1992

[54] TORQUE CONTROL CLUTCH

[75] Inventors: Gregory P. Albert; Stephen J. Synoracki, both of Waverly, N.Y.

[73] Assignee: Ingersoll-Rand Company, Woodcliff Lake, N.J.

[21] Appl. No.: 763,373

[22] Filed: Sep. 20, 1991

[51] Int. Cl.⁵ .............................................. F16D 13/22
[52] U.S. Cl. ................................. 192/0.034; 192/150
[58] Field of Search ................ 192/0.034, 150; 173/12

[56] References Cited

U.S. PATENT DOCUMENTS

| | | | |
|---|---|---|---|
| 3,289,715 | 12/1966 | De Groff et al. | 192/150 X |
| 4,006,785 | 2/1977 | Roll et al. | 173/12 |
| 4,078,618 | 3/1978 | De Pagter et al. | 173/12 |
| 4,088,197 | 5/1978 | Roll et al. | 192/150 X |
| 4,223,745 | 9/1980 | Workman, Jr. | 173/12 |
| 4,265,320 | 5/1981 | Tanaka et al. | 192/0.034 X |
| 4,429,775 | 2/1984 | Teramoto | 173/12 X |

Primary Examiner—Leslie A. Braun
Assistant Examiner—Nicholas Whitelaw
Attorney, Agent, or Firm—Walter C. Vliet

[57] ABSTRACT

A torque control shutoff clutch for power tools is provided with a torque recovery camming device which assists in decoupling the applied power of the clutch along with the shutting off of the motor driving the power tool. The clutch permits automatic reset of the device upon release of the throttle trigger and further throttles air flow to the power source just prior to shutoff thereby minimizing operator shutoff torque reaction.

19 Claims, 5 Drawing Sheets

THREADED FASTENER DRIVE

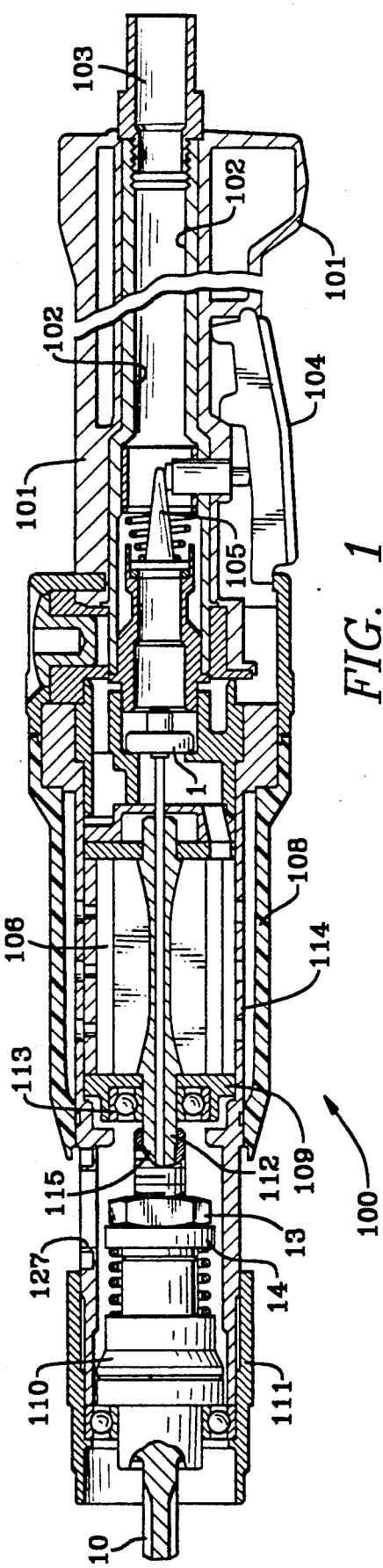
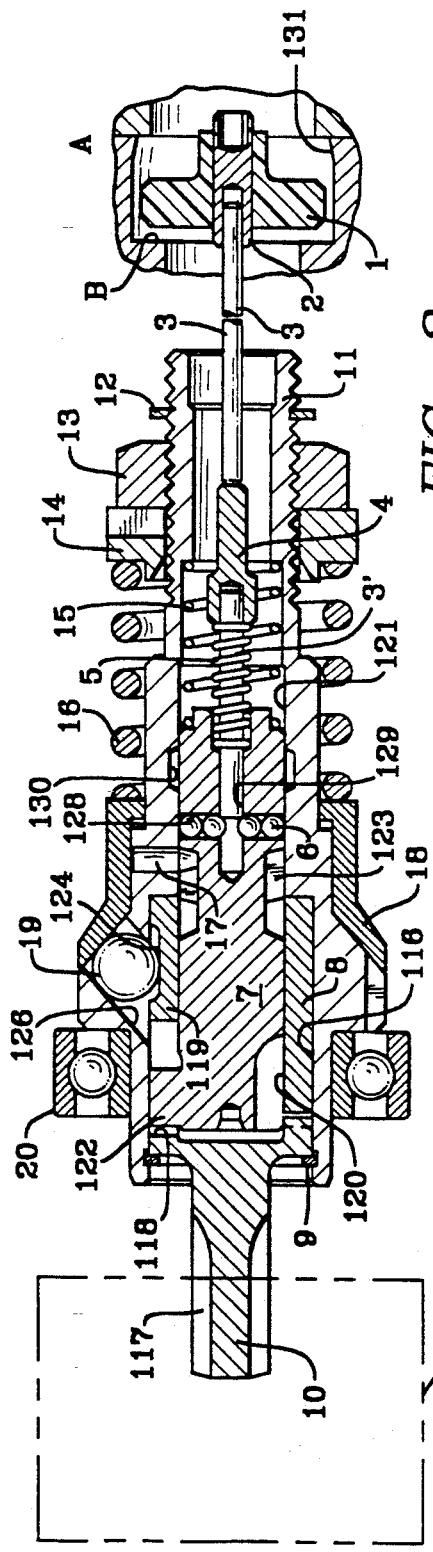
FIG. 1
FIG. 2
THREADED FASTENER DRIVE

TORQUE CONTROL CLUTCH

BACKGROUND OF THE INVENTION

This invention relates generally to torque control shutoff clutches for power tools and the like and more particularly to a controlled fluid shutoff and reset mechanism for a fluid operated tool.

Fluid operated tools for driving fasteners and the like typically incorporate a rotary vane air motor to drive a rotary shaft connected to a tool bit. Such tools are often equipped with a clutch mechanism that responds to the torque imparted by the tool to the fastener. When a specific torque is reached, the clutch mechanism automatically decouples the motor from the tool bit and terminates further tool output to the fastener.

It is desirable that the decoupling and shutoff occur as cleanly and as closely as possible to a desired applied torque. If the motor is not decoupled there occurs substantial inertial followup which may overtighten the fastener and lead to greater torque reaction on the operator. If the motor is not shut off upon clutch release it will continue to run without accomplishing useful work until the operator shuts it off.

In addition, an automatic reset of the mechanism is a desirable feature. A particular problem of prior art devices has been the inability to achieve clean clutch jaw disengagement and lockout near the point of shutoff thereby producing damage to the clutch face components and a ratcheting impact effect as the device coasts to a stop.

The foregoing illustrates limitations known to exist in torque control shutoff devices for power tools. Thus, it is apparent that it would be advantageous to provide an alternative directed to overcoming one or more of the limitations set forth above. Accordingly, a suitable alternative is provided including features more fully described hereinafter.

SUMMARY OF THE INVENTION

In one aspect of the present invention this is accomplished by providing a torque control clutch comprising a rotary driven clutch shaft element having an axial bore; an output clutch spindle mounted for rotation within the axial bore; a cam shaft mounted in the bore for both rotation and reciprocation along the axis of the axial bore; a means for reciprocating the cam shaft in response to the rotational position of the cam shaft in the bore; a means for selectively resisting relative rotation of the cam shaft in the bore during a selected torque rise and alternatively assisting rotation of the cam shaft once a selected torque level is achieved to effect reciprocation of the cam shaft; and a means for selectively coupling the cam shaft to the output clutch spindle in response to the axial position of the cam shaft relative to the clutch shaft.

The foregoing and other aspects will become apparent from the following detailed description of the invention when considered in conjunction with the accompanying drawing figures.

BRIEF DESCRIPTION OF THE DRAWING FIGURES

FIG. 1 is a cross sectional view of a fluid power operated tool according to the present invention showing the shutoff clutch of the present invention;

FIG. 2 is an enlarged detail cross section of the torque control clutch according to the present invention;

DETAILED DESCRIPTION

General Construction

Figure 3A:
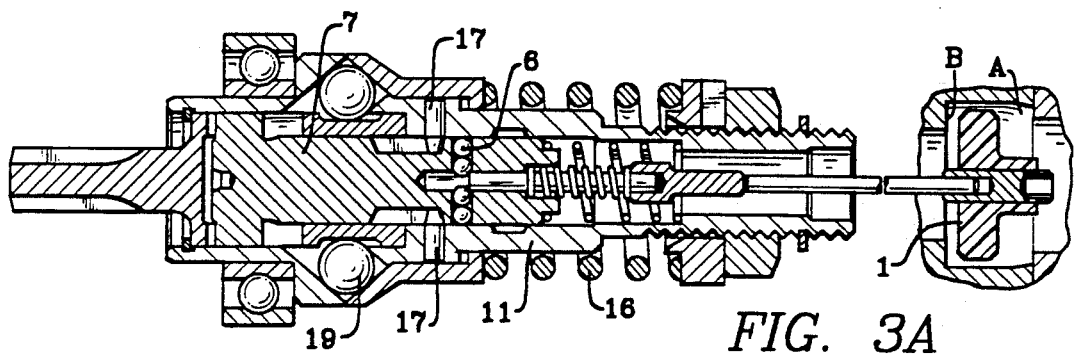
FIGS. 3A through 3E show stepwise the function of the torque control clutch according to the present invention.

Referring to FIG. 1, the present invention is shown embodied in a pneumatic nutrunner generally indicated by reference numeral 100. The exterior of the tools is comprised of a handle 101, a motor housing 108, and a clutch housing 109. The handle 101 is provided with an air inlet 103 leading to an inlet air passage 102 which in turn provides pneumatic pressure fluid or air to a manually operated tilt valve 105. The tilt valve 105 is operated by a throttle lever 104 in a conventional manner.

Air passing the tilt valve 105 is admitted to an air chamber A, as best seen on FIG. 2, which houses an automatic shutoff valve 1. The automatic shutoff valve 1 controls the air flow to a pneumatically driven motor 106 which in turn drives the automatic shutoff clutch 110. The power of the motor is transmitted through the clutch to a clutch spindle 10. The clutch spindle 10 may be used to drive a screwdriver or similar fastening driver through a gear reducer or the like (not shown).

Referring to FIG. 2, the shutoff clutch according to the present invention is shown and comprises a shutoff valve 1, disposed in an air chamber A, which receives pneumatic pressure fluid, such as air, as previously described. The shutoff valve 1 seats against a shutoff valve seat B which allows air to pass to the air motor 106 in the open position and prevents air from proceeding to the motor in a second closed position. The shutoff valve 1 is positioned and operated by a pushrod 3 which is further provided with an adjustment screw 2 permitting accurate positioning of the shutoff valve relative to the shut-off valve seat B and throttle seat C.

For ease of construction and assembly it has been found advantageous to provide the pushrod with an intermediate shutoff spool 4 which is attached to the continuation of the pushrod 3 which is inserted in a bore in cam shaft 7. The shutoff spool 4 provides a shoulder against which valve return spring 5 may exert force to return the shutoff valve to its open or reset position. The valve return spring 5 is a compression spring inserted between the cam shaft 7 and the shutoff spool 4 and provides only such force as is required to reset the shutoff valve when pressure in chamber A is removed. As, for example, when the operator releases the throttle lever 104.

The unique shutoff clutch of the present device is characterized by a clutch shaft 11 which is mounted for rotation in bearing 20 at one end and guided for rotation about the output shaft 112 of air motor 106. The output shaft 112 rotates about a bearing 113 which in turn is mounted to the front end plate 109 of the air motor 106 which is in turn mounted in the cylinder 114. The clutch housing 111 is formed as an extension of the cylinder 114 for ease of manufacture and assurance of concentricity of the motor rotation and shutoff clutch.

The output shaft 112 is provided with a hexagonal male drive which cooperates with a hexagonal female drive element in the clutch shaft 11 as seen in FIG. 1.

It will be appreciated by one skilled in the art that rotation of the air motor 106 will be imparted to the clutch shaft 11 through the hexagonal drive 115. The clutch shaft 11 is provided with stepped longitudinal bore 116 having its greatest diameter to the left as shown in FIG. 2. As best seen in FIG. 2, inserted in the largest diameter of bore 116 is a cam block 8 which is free to rotate within the bore 116. Also inserted in the bore is a clutch spindle 10 which is also free to rotate within the bore 116. Both the clutch spindle and the cam block 8 are retained in the bore by means of a retaining ring 9.

The clutch spindle 10 is provided with a spline drive 117 at its output end shown to the left in FIG. 2 and a crow foot drive recess 118 at its other end facing the cam block 8. Cam block 8 is similarly provided with a crow foot drive recess 119 at its one end facing the clutch spindle. Cam block 8 is also provided with a longitudinal bore 120 which for purposes of the present embodiment is approximately the same diameter as the first reduced step 121 of the clutch shaft 11.

A cam shaft 7 is disposed for longitudinal reciprocation in bores 116 and 121. The cam shaft 7 is provided with crow foot slot dogs at its one end which in one engaged position cooperates with the drive recesses 118 and 119 to engage the clutch spindle with the cam block and in a second position reciprocated to the right is disposed fully within the slot 119 so as to disengage the cam block 8 from the clutch spindle 10 thereby permitting the clutch spindle 10 to freely rotate within the bore 116.

The cam shaft 7 is provided with an accurate cam surface 123 which cooperates with cam pin 17 to effect longitudinal displacement or reciprocation of cam shaft 7 depending on the rotational positioning of the cam shaft 7 relative to the clutch shaft 11. It should be appreciated by one skilled in the art that the rotational position of cam shaft 7 relative to the clutch shaft 11 is determined by the rotational position of cam block 8 relative to the clutch shaft 11.

The rotational position of the cam block 8 is determined by an accurate tri-lobe cam face 124 disposed upon the periphery of the cam block 8. The rotational position of cam block 8 relative to the clutch shaft 11 is determined by the torque output of the clutch and the degree of preload established on cam balls 19 which cooperate with the accurate cam 124 through a guide hole 126 provided in the clutch shaft 11.

The amount of preload on the cam balls 19 is established by cam follower 18 which is free to translate longitudinally along the outside periphery of clutch shaft 11. The preload is established by clutch spring 16 which in turn is preloaded by adjusting nut 13 and adjusting nut lock 14. A snap ring stop 12 is provided to prevent the accidental unscrewing of the adjusting nut.

Torque adjustment may be accomplished by inserting a screwdriver or the like in access slot 127 provided in the cylinder 114 with adjustment taking place by effecting rotation between the adjusting nut 13 and the adjusting nut lock 14 by rotation of the screwdriver.

It should be appreciated by one skilled in the art that as the adjusting nut lock 14 is displaced to the left, as shown in FIG. 2, the preload on clutch spring 16 is increased thereby increasing the load on the cam follower 18 and the cam ball 19. This increases the resistance to rotation of the cam block 8 relative to the clutch shaft 11 for a given torque output. The precise interaction between cam ball 19 and the accurate tri-lobe cam 124 will be described later under operation.

Figure 3B:
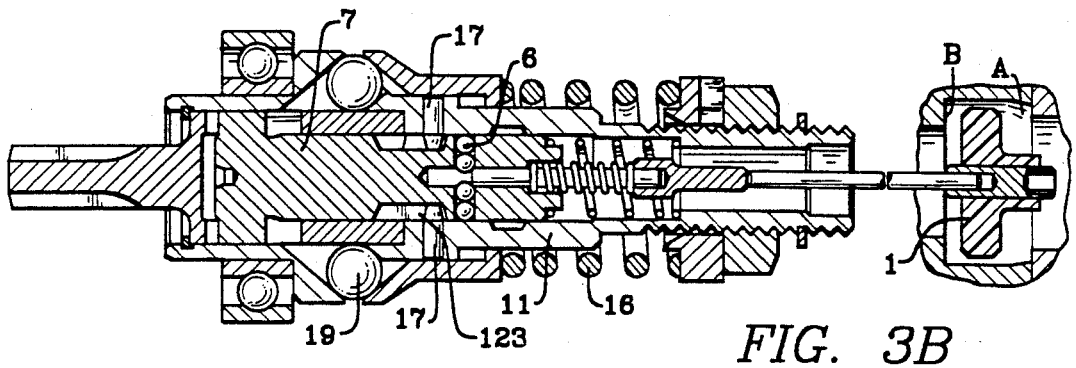
Figure 3C:
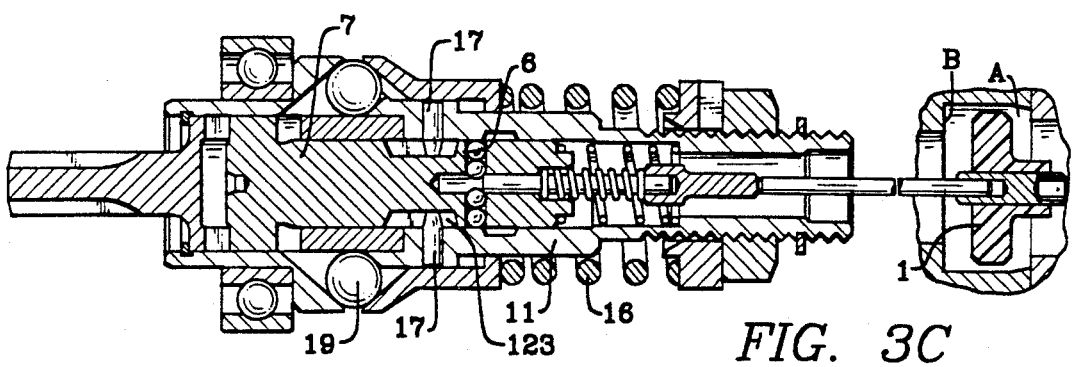
Figure 3D:
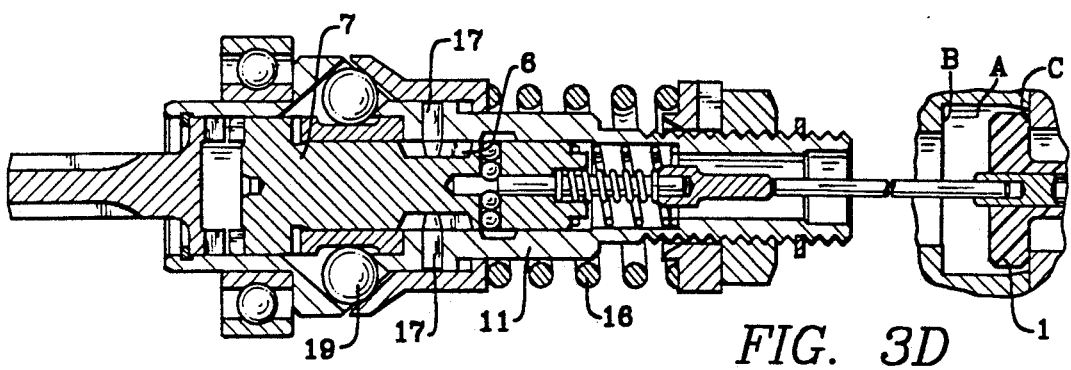

It is sufficient at this point to understand that relative rotation between the cam block 8 and the clutch shaft 11 will effect translation of the cam shaft 7 to the right, as shown in FIGS. 3B, 3C, and 3D.

Cam shaft 7 is further provided with radial bores 128 which contains a plurality of radially disposed shutoff balls 6. The shutoff balls intercept a longitudinal bore 129 in the cam shaft 7 which in turn receives the continuation of pushrod 3.

Figure 3E:
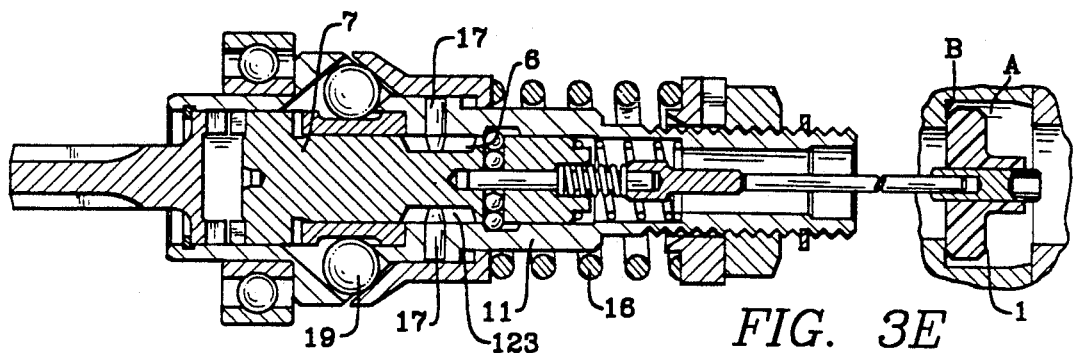

As shown in FIG. 2, in the drive position the shutoff balls support the pushrod to hold the shutoff valve 1 in its open position during fastener rundown. The clutch shaft 11 is provided with a recess 130 which can receive the shutoff balls 6 when the cam shaft 7 has been reciprocated or displaced longitudinally to the right. Displacement of the shutoff balls into the recess 130 will allow the pushrod to collapse past the shutoff balls and shut off the air flow to the motor when the shutoff valve cooperates with the shutoff valve seat B, as shown in FIG. 3E. At this point the follow through and override of cam balls 19 on accurate cam 124 effect the positioning of the cam pin with respect to accurate cam 123 such that reset spring 15 may return the cam shaft to the left engaged position as shown in FIG. 2. As long as the throttle lever 104 is depressed the shutoff valve 1 will seat against the shutoff valve seat B. Once the throttle lever 104 is released, air pressure will bleed from chamber A allowing the shutoff valve 1 to be reset to its open position by valve return spring 5.

In OPERATION, throttle lever 104 is depressed upsetting tilt valve 105 to allow air pressure supplied air inlet 103 to be applied to air chamber A where it bypasses shutoff valve 1 and operates the air motor.

Operation of the air motor applies the output torque of the air motor to the shutoff clutch of the present invention which in turn applies the output torque to the clutch spindle 10 and subsequently through gear reductions to a fastener which is to be tightened.

Figure 4A:
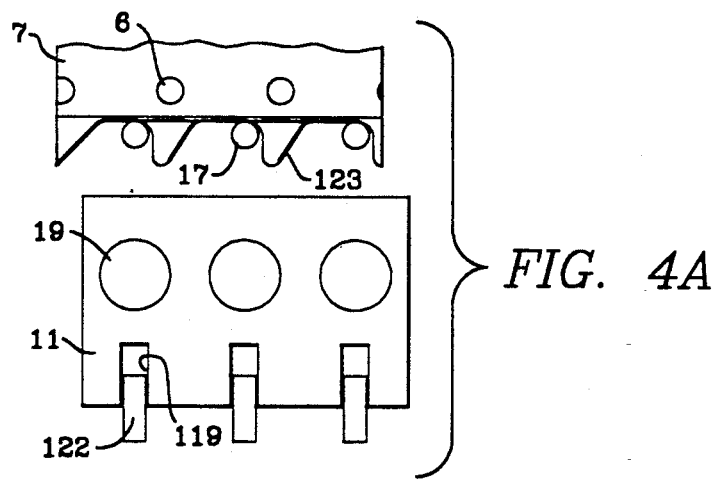
FIGS. 4A through 4E show corresponding cam block and cam shaft positions to FIGS. 3A through 3E, respectively.
Figure 4B:
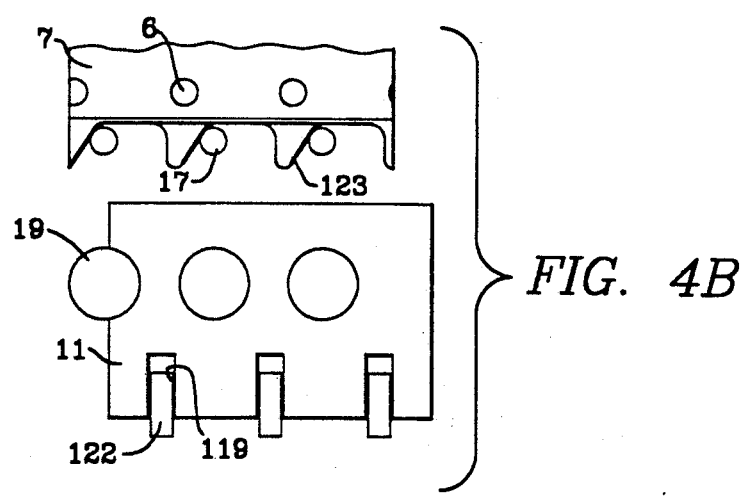
Figure 5:
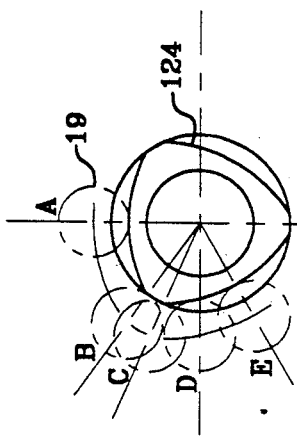
FIG. 5 shows the radial positioning of the respective positions in FIGS. 4A through 4E of the cam balls on the cam block.
Figure 4D:
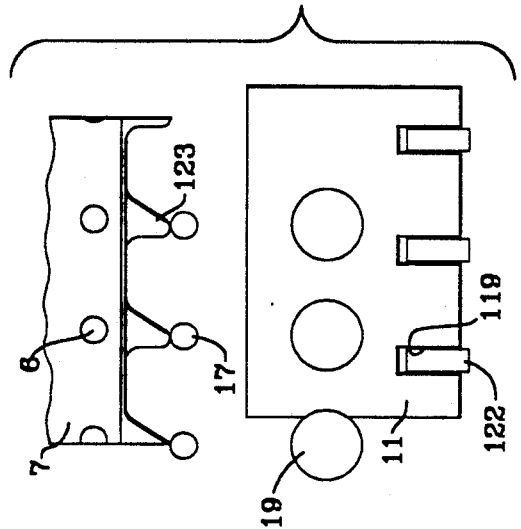
Figure 4C:
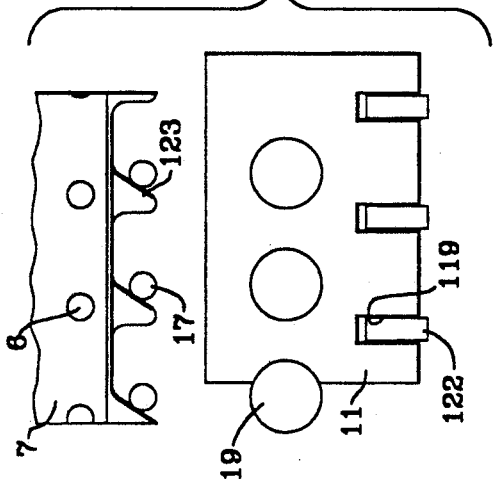
Figure 4E:
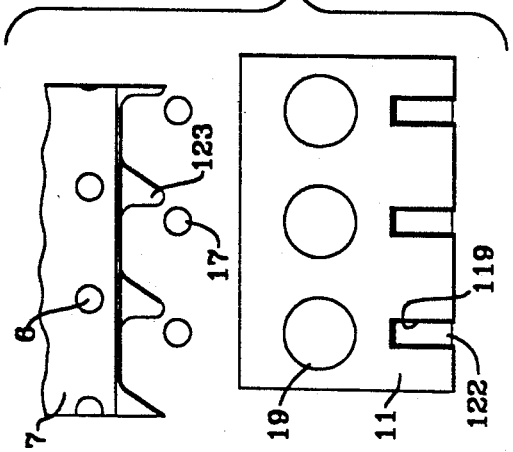
Figure 6:
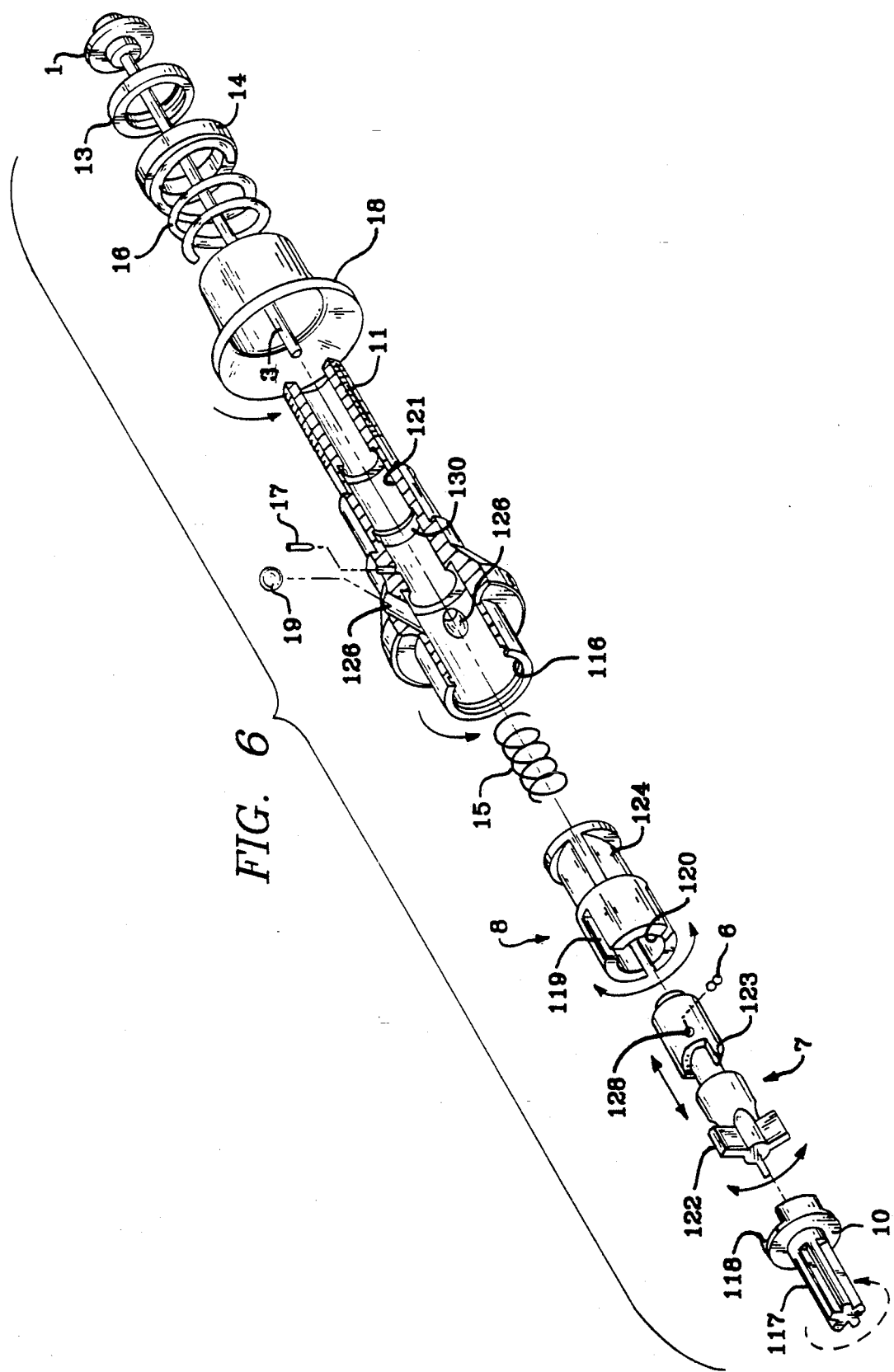

FIG. 3A and FIG. 4A show the respective positions of the components and cam timing during initial start and rundown. As the torque applied increases the relative position of the ca block to the clutch shaft, as seen depicted in FIG. 5, as controllable by the preload on tri-lobe cam 124, best seen on FIG. 5, the disengaging cam pin 17 progresses to the shutoff cam lobe 123 and begins to ride up the cam lobe which displaces the cam shaft 7 and the drive dogs 122 to disengage from the clutch spindle 10, as shown in progression through FIGS. 3B and 3C and FIGS. 4B and 4C.

At this point the spindle becomes disengaged and the cam balls 19 go over center on the lobe of cam 124 producing a back drive of the cam due to stored energy in clutch spring 16 being released through cam follower 18 and the cam balls 19. This assists the cam block 8 to effect greater rotational displacement between the cam shaft and the clutch shaft as shown in FIGS. 3D and 3E and 4D and 4E, respectively. When the cam shaft and the clutch shaft reach the relative position shown in FIGS. 3E and 4E the shutoff balls move radially outward into recess 130 which permits the pushrod to collapse and thereby shut off the motor.

When the push rod extension 3' collapses past the radial bores 128 it locks the shutoff balls 6 in the radial outward position shown in FIGS. 3D and 3E. The shutoff balls 6 in recess 130 prevent the cam shaft 7 from returning to the clutch engaged position until the push rod extension 3' is reset. Reset is accomplished by releasing the throttle lever. This results in decay of pressure in Chamber A through a small vent provided (not shown). When the pressure has diminished sufficiently, the shutoff valve 1 is reset by valve return spring 5. The shutoff balls are then returned radially inward by camming action on the edge of recess 130. The cam shaft is returned to its initial engaged position (FIG. 3A) by reset spring 15. The cycle is then again ready to be repeated.

One feature of operation shown in FIG. 3D is the fact that as the shutoff valve 1 approaches throttle seat C the operating air or pneumatic fluid is throttled. This is accomplished by the fact that the shutoff valve 1 approaches the throttle seat C and also the chamber A is provided with a reducing taper 131 (as seen in FIG. 2) towards the throttle seat C. This results in restricted flow near shutoff and full flow of air during run down where operating speed is important to achieve.

This minimizes the possibility of overspeed during the shutoff process and further assists the shutoff valve to its shutoff position as shown in FIG. 3. The result is the rotational energy of the rotating decoupled power source is then smoothly dissipated through internal friction without adversely effecting the clutch output torque or the operator sensed torque reaction.

Having described the invention, what is claimed is:

1. a torque control clutch comprising:
   a rotary driven clutch shaft element having an axial bore;
   an output clutch spindle mounted for rotation within said axial bore;
   a cam shaft mounted in said bore for both rotation and reciprocation along the axis of said axial bore;
   a means for reciprocating said cam shaft in response to the rotational position of said cam shaft in said bore;
   a means for selectively resisting relative rotation of said cam shaft in said bore during a selected torque rise and alternatively assisting rotation of said cam shaft once a selected torque level is achieved to effect reciprocation of said cam shaft; and
   a means for selectively coupling said cam shaft to said output clutch spindle in response to the axial position of said cam shaft relative to said clutch shaft.

2. A torque control clutch according to claim 1, wherein said clutch shaft further comprises a rotatable shaft having a stepped axial bore adapted to be driven at one end by a motor.

3. A torque control clutch according to claim 2, wherein said output clutch spindle is mounted within said stepped axial bore.

4. A torque control clutch according to claim 3, wherein said output clutch spindle is further adapted to drive a threaded fastener.

5. A torque control clutch according to claim 2, wherein said cam shaft is inserted in said stepped axial bore as a means for alternatively engaging said clutch spindle as a means for driving said clutch spindle in a rotary direction in response to rotation of said clutch shaft and said cam shaft is provided with a means for reciprocating said cam shaft comprising a cam and follower sensing relative rotation between said clutch shaft and said cam shaft.

6. A torque control clutch according to claim 5, wherein said means for reciprocating said cam shaft is further characterized by an accurate cam on the surface of said cam shaft which coacts with a cam follower projecting from said clutch shaft as a means for establishing an axial position of said cam shaft relative to said clutch shaft.

7. A torque control clutch according to claim 1, wherein said means for selectively resisting relative motion of said cam shaft further comprises a cylindrical ca block rotatably disposed within said bore of said clutch shaft further characterized in that said cam block is provided with a rotation resist/assist cam surface on its periphery and a first drive means on an end of said cam block which cooperates with a driven dog means on said cam shaft to effect rotation of said cam shaft in response to a resisting or assisting rotating force produced on said cam surface on said cam block.

8. A torque control clutch according to claim 7, wherein said means for selectively resisting relative motion of said cam shaft further comprises a means for producing said resisting or assisting force.

9. A torque control clutch according to claim 8, wherein said means for producing said resisting or assisting force comprises a plurality of cam balls preloaded into contact with said rotation resist/assist cam surface by adjustable spring means.

10. A torque control clutch according to claim 9, wherein said spring means is disposed about the periphery of said clutch shaft for rotation therewith and said cam balls project through said clutch to contact said rotation resist/assist cam surface.

11. A torque control clutch according to claim 1, further comprising means for shutting off a motor driving said torque control clutch in response to said selected torque level being achieved.

12. A torque control clutch according to claim 11, wherein said means for shutting off said motor further comprises a valve means disposed in a passageway between a pressure fluid inlet and said motor, and said valve means is selectively positioned to an on and an off position by a rod actuator cooperating with said cam shaft.

13. A torque control clutch according to claim 12, wherein said cam shaft is provided with a bore for selectively receiving said rod actuator.

14. A torque control clutch according to claim 13, wherein said bore comprises an axial bore having means for selectively accepting said rod actuator and alternatively securing said cam shaft in an axially decoupling position relative to said output clutch spindle.

15. A torque control clutch according to claim 14, wherein said means for selectively accepting said rod actuator further comprises means for alternatively interacting with said rod actuator for preventing relative movement of said rod actuator to said cam shaft and said clutch shaft for securing said cam shaft relative to said clutch shaft.

16. A torque control clutch according to claim 15, wherein said means for selectively accepting said rod actuator comprises a plurality of balls disposed in a cross bore intersecting said axial bore and said balls project into said axial bore in one operating mode and project into a circumferential groove in said clutch shaft in a second clutch lockout mode.

17. A torque control clutch according to claim 11, wherein said valve means is positioned in a passageway provided with a valve seat for shutting off said passageway in one selected off position and a second valve seat cooperating with said valve means in a selected on position to throttle pressure fluid flowing in said passageway to create a reduced flow of pressure fluid and an increase in pressure on said valve to assist said valve to said first selected shutoff position.

18. A torque control clutch according to claim 17, wherein said passageway is further provided with a taper for further controlling the rate of throttling of said pressure fluid in said passageway from a position of substantially reduced throttling effect when said valve is in a position spaced apart from said second valve seat and said pressure fluid is throttled increasingly as said valve approaches said second valve seat prior to initiation of shutoff.

19. A torque control clutch according to claim 11, wherein said motor is an air motor.

* * * * *